United States Patent
Sun et al.

(10) Patent No.: US 10,470,206 B2
(45) Date of Patent: Nov. 5, 2019

(54) COMPUTER PROGRAM, COMPUTER-READABLE STORAGE MEDIUM, ACCESS POINTS, WIRELESS DEVICE AND METHODS PERFORMED THEREIN

(71) Applicant: Telefonaktiebolaget LM Ericsson (publ), Stockholm (SE)

(72) Inventors: Ying Sun, Sundbyberg (SE); Torbjörn Wigren, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/750,944

(22) PCT Filed: Sep. 4, 2015

(86) PCT No.: PCT/SE2015/050937
§ 371 (c)(1),
(2) Date: Feb. 7, 2018

(87) PCT Pub. No.: WO2017/039512
PCT Pub. Date: Mar. 9, 2017

(65) Prior Publication Data
US 2018/0249493 A1  Aug. 30, 2018

(51) Int. Cl.
  *H04W 72/12* (2009.01)
  *H04L 12/26* (2006.01)
  *H04L 5/00* (2006.01)

(52) U.S. Cl.
  CPC ..... *H04W 72/1278* (2013.01); *H04L 43/0852* (2013.01); *H04W 72/1231* (2013.01); *H04L 5/0035* (2013.01)

(58) Field of Classification Search
  CPC ......... H04W 72/1278; H04W 72/1231; H04W 72/00; H04W 72/12; H04W 72/1205;
(Continued)

(56) References Cited

U.S. PATENT DOCUMENTS

2010/0232373 A1\* 9/2010 Nory .................. H04W 72/1289
  370/329
2011/0249619 A1\* 10/2011 Yu .......................... H04B 7/024
  370/328
(Continued)

FOREIGN PATENT DOCUMENTS

WO  2015103383 A1  7/2015

OTHER PUBLICATIONS

Oh, Jinyoung et al., "Centralized Resource Coordination Scheme for Inter-enB CoMP with Non-ideal Backhaul", Globecom 2014 Workshop—Emerging Technologies for 5G Wireless Cellular Networks, IEEE, Dec. 8, 2014, 827-832.

*Primary Examiner* — Warner Wong
(74) *Attorney, Agent, or Firm* — Patent Portfolio Builders, PLLC

(57) ABSTRACT

Embodiments herein relate to a method performed by a first access point (12) out of at least two access points for handling communication of a wireless device (10) served by the first access point (12) in a wireless communication network (1). The first access point (12) coordinates communication with a second access point (13) out of the at least two access points in the wireless communication network (1), which coordination is performed over a backhaul connection between the first access point (12) and the second access point (13). The first access point determines a delay of the backhaul connection to the second access point (13). The first access point (12) schedules a transmission to or from the wireless device (10) based on the determined delay, wherein the transmission from or to the wireless device (10) is delayed.

12 Claims, 10 Drawing Sheets

(58) Field of Classification Search
CPC ......... H04W 72/1263; H04W 28/0236; H04W 56/004; H04W 56/0055; H04W 74/00; H04W 74/04; H04L 43/0852; H04L 5/0035; H04L 47/15
See application file for complete search history.

(56) References Cited

U.S. PATENT DOCUMENTS

| | | | |
|---|---|---|---|
| 2014/0148181 A1* | 5/2014 | Lee | H04W 72/085 455/452.1 |
| 2015/0056992 A1* | 2/2015 | Morita | H04W 72/0426 455/435.1 |
| 2015/0208366 A1* | 7/2015 | Papasakellariou | H04W 74/0833 370/311 |
| 2015/0282202 A1* | 10/2015 | Miao | H04L 1/00 370/329 |
| 2016/0192386 A1* | 6/2016 | Kim | H04W 72/1284 370/329 |
| 2016/0219616 A1* | 7/2016 | Ni | H04W 72/14 |
| 2017/0359806 A1* | 12/2017 | Takeda | H04W 72/04 |

* cited by examiner

COMPUTER PROGRAM, COMPUTER-READABLE STORAGE MEDIUM, ACCESS POINTS, WIRELESS DEVICE AND METHODS PERFORMED THEREIN

TECHNICAL FIELD

Embodiments herein relate to a computer program, a computer-readable storage medium, a first access point, a second access point, a wireless device and methods performed therein for wireless communication. In particular, embodiments herein relate to handling communication of the wireless device served by the first access point in a wireless communication network.

BACKGROUND

In a typical wireless communication network, wireless devices, also known as wireless communication devices, mobile stations, stations (STA) and/or user equipments (UEs), communicate via a Radio Access Network (RAN) to one or more core networks. The RAN covers a geographical area which is divided into areas or cell areas, with each area or cell area being served by an access point e.g. a transmission point such as a Wi-Fi access point or a radio base station (RBS), which in some networks may also be denoted, for example, a "NodeB" or "eNodeB". The area or cell area is a geographical area where radio coverage is provided by the access point. The access point communicates over an air interface operating on radio frequencies with the wireless device within range of the access point.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks and UTRAN specifically, and investigate enhanced data rate and radio capacity. In some RANs, e.g. as in UMTS, several access points may be connected, e.g., by landlines or microwave, to a controller node, such as a radio network controller (RNC) or a base station controller (BSC), which supervises and coordinates various activities of the plural access points connected thereto. This type of connection is sometimes referred to as a backhaul connection. The RNCs are typically connected to one or more core networks.

Specifications for the Evolved Packet System (EPS) have been completed within the 3$^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access technology wherein the access points are directly connected to the EPC core network rather than to RNCs. In general, in E-UTRAN/LTE the functions of an RNC are distributed between the access points, e.g. eNodeBs in LTE, and the core network. As such, the Radio Access Network (RAN) of an EPS has an essentially "flat" architecture comprising access points connected directly to one or more core networks, i.e. they are not connected to RNCs. To compensate for that, the E-UTRAN specification defines a direct interface between the access points, this interface being denoted the X2 interface.

There exist today many coordination schemes to improve overall system efficiency of the wireless communication network by either increasing signal strength or decreasing interference level such as Coordinated Multi-point (CoMP). Typical coordination schemes in the purpose of increasing signal strength are for example, downlink joint transmission and uplink joint reception wherein coordinated beamforming increases the signal strength of one wireless device without introducing interference to other wireless devices. CoMP is used to send and receive data to and from a wireless device from several transmission points to ensure that an optimum performance is achieved. Typical coordination schemes in the purpose of decreasing the interference are for example dynamic point blanking and dynamic point power control, wherein the signal quality in terms of Signal to Interference plus Noise Ratio (SINR) will be improved by reducing the interference power.

The access points may be coordinating the transmissions by exchanging or informing one another over a backhaul connection between the access points. The term backhaul may be used to describe the entire wired part of the wireless communication network between the access points but may comprise wireless connections as well. Depending on a delay of the backhaul connection, also referred to as a backhaul delay, between the serving access point and the coordination access point, the coordination schemes may be further categorized as fast, relaxed and slow coordination. Coordination schemes such as, Enhanced Inter-Cell Interference Coordination (eICIC), Further Enhanced Inter-Cell Interference Coordination (FeICIC), and LTE dual connectivity, are aiming at cell level coordination and may be applied on a slow backhaul connectivity where no scheduling information needs to be exchanged and a coordination period could be longer than a couple of ten scheduling periods.

The objective of fast and relaxed backhaul coordination is to coordinate the receptions/transmissions individually at wireless devices level where a scheduling decision of each wireless device needs to be exchanged from serving cell to the coordinator cell. Upon the reception of the scheduling decision, the access point of the coordinator cell may perform different coordination algorithms together with the serving cell at the allocated resources to improve the channel quality for the wireless device. Such algorithms are for example, joint reception in the uplink e.g. Uplink (UL) CoMP, joint transmission or muting interferers in downlink e.g. Downlink (DL) CoMP. The difference between fast coordination where the backhaul delay is limited to one scheduling period, e.g. one Transmission Time Interval (TTI), and the relaxed coordination, is that the backhaul delay typically is longer than one TTI but shorter than 10 TTIs.

One problem with a relax backhaul coordination is caused by the transmission delay introduced on the interface between the access points. When the backhaul delay is longer than a processing time at the wireless device, i.e., the time from a grant/assignment is sent to the wireless device to the time of the transmission made from the wireless device, the transmission in the serving cell will be made earlier than or before the scheduling decision is received at the access node of the coordinator cell. Thus, no gain will be achieved with the coordination. For time critical services such as Voice over LTE (VoLTE) with periodic traffic characteristics, it has been proposed to preconfigure the same scheduling decision for both serving and coordinator cells. The serving cell will transmit when there is data according to the configured scheduling decision, whereas the coordinator is trying to decode the transmission according to the configuration without any knowledge if there is transmission. The solution is not efficient and thereby limits the performance of the wireless communication network.

SUMMARY

An object of embodiments herein is to provide a mechanism that improves performance of the wireless communication network using coordinated access points.

According to an aspect the object is achieved by a method performed by a first access point out of at least two access points for handling communication of a wireless device served by the first access point in a wireless communication network. The first access point coordinates communication with a second access point out of the at least two access points in the wireless communication network. The coordination is performed over a backhaul connection between the first access point and the second access point. The first access point determines a delay of the backhaul connection to the second access point; and schedules a transmission to or from the wireless device based on the determined delay, wherein the transmission from or to the wireless device is delayed.

According to another aspect the object is achieved by a method performed by a wireless device for handling communication of the wireless device served by a first access point out of at least two access points in a wireless communication network. The first access point coordinates communication with a second access point out of the at least two access points in the wireless communication network. The coordination is performed over a backhaul connection between the first access point and the second access point. The wireless device receives a delay indication from the first access point informing the wireless device of a time instance to transmit or receive with a delay associated with a delay of the backhaul connection. The wireless device delays a transmission or a reception of data based on the received delay indication.

According to yet another aspect the object is achieved by a method performed by a second access point out of at least two access points for handling communication of a wireless device served by a first access point in a wireless communication network. The first access point coordinates communication with the second access point out of the at least two access points in the wireless communication network. The coordination is performed over a backhaul connection between the first access point and the second access point. The second access point receives a scheduling indication from the first access point indicating a scheduled transmission, which scheduling indication is transmitted over the backhaul connection at a scheduled frame number. The second access node receives a further delay indication from the first access point informing the second access point of a further time instance to transmit or receive with a further delay.

According to still another aspect the object is achieved by providing a first access point for handling communication of a wireless device served by the first access point in a wireless communication network. The first access point out of at least two access points is configured to coordinate communication with a second access point out of the at least two access points in the wireless communication network, wherein the first access point is configured to coordinate the communication over a backhaul connection between the first access point and the second access point. The first access point is configured to determine a delay of the backhaul connection to the second access point. The first access point is further configured to schedule a transmission to or from the wireless device based on the determined delay, wherein the transmission from or to the wireless device is delayed.

According to yet still another aspect the object is achieved by providing a wireless device for handling communication of the wireless device served by a first access point out of at least two access points in a wireless communication network. The first access point coordinates communication with a second access point out of the at least two access points in the wireless communication network. The coordination is performed over a backhaul connection between the first access point and the second access point. The wireless device is configured to receive a delay indication from the first access point informing the wireless device of a time instance to transmit or receive with a delay associated with a delay of the backhaul connection. The wireless device is further configured to delay a transmission or a reception of data based on the received delay indication.

In addition, according to another aspect the object is achieved by providing a second access point for handling communication of a wireless device served by a first access point in a wireless communication network. The first access point out of at least two access points is configured to coordinate communication with the second access point out of the at least two access points in the wireless communication network, wherein the second access point is configured to coordinate with the first access point over a backhaul connection between the second access point and the first access point. The second access point is configured to receive a scheduling indication from the first access point indicating a scheduled transmission, and to receive a further delay indication from the first access point informing the second access point of a further time instance to transmit or receive with a further delay.

Also a computer program, comprising instructions, which, when executed on at least one processor, cause the at least one processor to carry out the method herein is herein provided. Also a computer-readable storage medium having a computer program stored thereon, which computer code comprises instructions which, when executed on at least one processor, cause the at least one processor to carry out the methods herein is provided herein.

Embodiments herein provide a generic coordination scheme used for coordinated access points. By scheduling the wireless device based on the determined delay, e.g. adjust the time to send the grant/assignment to the wireless device, the second access node is enabled to receive or transmit the transmission with the intended resource allocation. This results in an improved performance of the wireless communication network as the coordination of the access points may be used in a satisfactory manner.

BRIEF DESCRIPTION OF THE DRAWINGS

Embodiments will now be described in more detail in relation to the enclosed drawings, in which.

DETAILED DESCRIPTION

Figure 1:
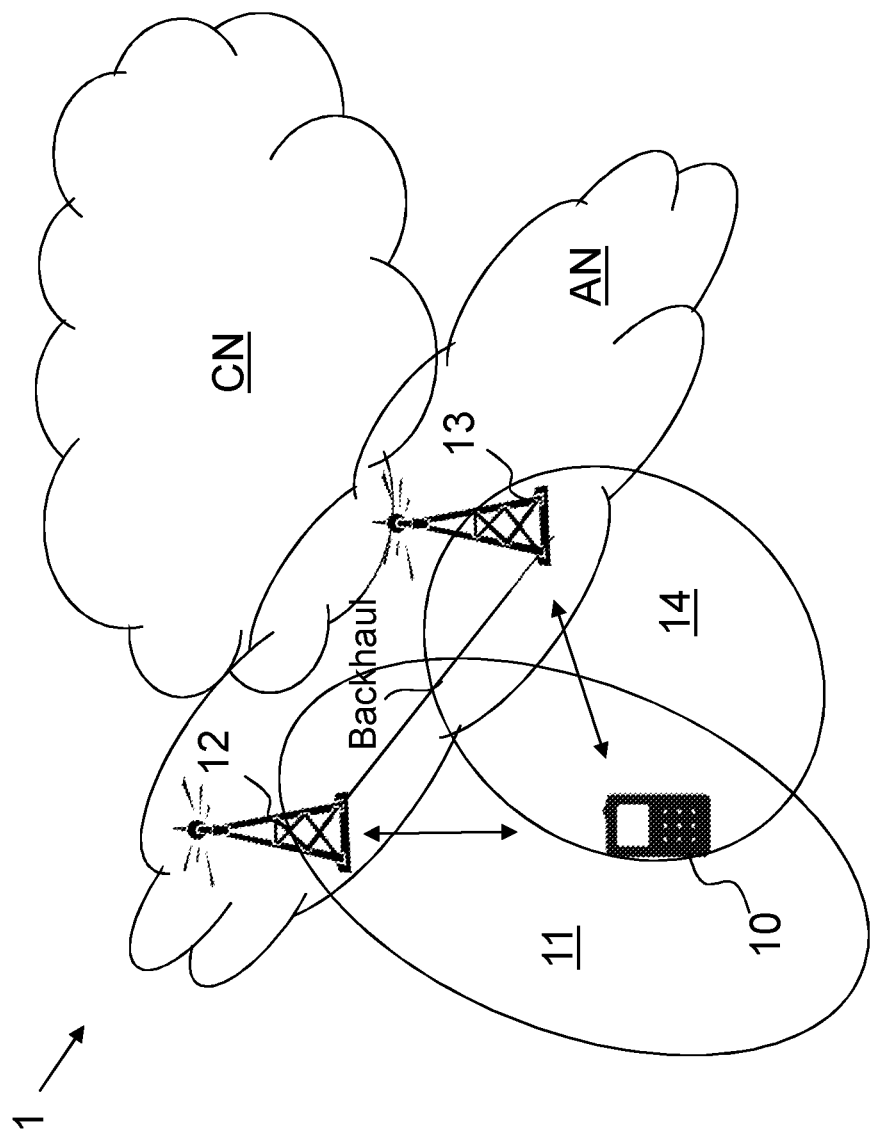
FIG. 1 shows a schematic overview depicting a wireless communication network according to embodiments herein.

Embodiments herein relate to wireless communication networks in general. FIG. 1 is a schematic overview depicting a wireless communication network 1. The wireless communication network 1 comprises one or more RANs and one or more CNs. The wireless communication network 1 may use a number of different technologies, such as Wi-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 1, wireless devices e.g. a wireless device 10 such as a mobile station, a non-access point station (non-AP STA), a STA, a user equipment and/or a wireless terminal, communicate via one or more Access Networks (AN), e.g. RAN, to one or more core networks (CN) or directly with one another. It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

The wireless communication network 1 comprises a first access point 12 out of a at least two access points providing radio coverage over a geographical area, a first area 11, of a first radio access technology (RAT), such as LTE, Wi-Fi or similar. The first access point 12 may be a transmission and reception point e.g. a radio network node such as a Wireless Local Area Network (WLAN) access point or an Access Point Station (AP STA), an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the area served by the first access point 12 depending e.g. on the first radio access technology and terminology used. The first access point may be referred to as a serving access point and communicates with the wireless device 10 with DL transmissions to the wireless device 10 and UL transmissions from the wireless device.

Furthermore, the wireless communication network 1 comprises a second access point 13 out of the at least two access points providing radio coverage over a geographical area, a second area 14, of a second RAT, such as LTE, Wi-Fi, WiMAX or similar. The second access point 13 may be a transmission and reception point e.g. a radio network node such as a WLAN access point or an Access Point Station (AP STA), an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the area served by the second access point 13 depending e.g. on the second radio access technology and terminology used. The first and second RAT may be the same or different RATs. The second access point 13 may be referred to as a coordinator access point.

The first access point 12 coordinates communication with the second access point 13 out of the at least two access points in the wireless communication network 1 using e.g. a CoMP scheme. This is done by communicating with one another over a backhaul connection, e.g. an X2 connection, an S1 connection or similar, between the first access point 12 and the second access point 13. The first access point 12 schedules transmissions to and from the wireless device 10 for both the first access node 12 as well as the second access node 13.

According to embodiments herein the first access point 12 determines a delay of the backhaul connection to the second access point 13. For example, the first access point 12 may measure the delay during configuration or measure the delay of packets transmitted between the first and second access points periodically or continuously. The first access point 12 may then schedule a transmission to or from the wireless device 10 taking the determined delay into account.

Embodiments herein are generic independent of traffic characteristics, the delay of the backhaul connection and may be applied for different services and control signaling. The delay of the backhaul connection may also vary over time and by determining the delay periodically or continuously this issue is solved by embodiments herein.

As embodiments herein provide a solution enabling a satisfactory coordination, better e.g. CoMP gain may be achieved since the second access point 13 has a chance to receive or transmit the transmission with the intended resource allocation. Thus, a receiving side can perform a successful combining of the received data from/to multiple access points.

Some embodiments herein are especially favorable where a coordinated multipoint transmission is bound to be a key technology to counter the effects of heavy shadowing at high carrier frequencies, and where Transmission Time Intervals (TTI) are planned to be significantly reduced to reduce delay or latency over the air interface, hence, a backhaul connection delay may therefore become dominating over a delay of the air interface. Another advantage of some of the embodiments herein is that no standard changes are required, whereby some embodiments herein are also applicable to the entire fielded fleet of legacy wireless devices.

Figure 2:
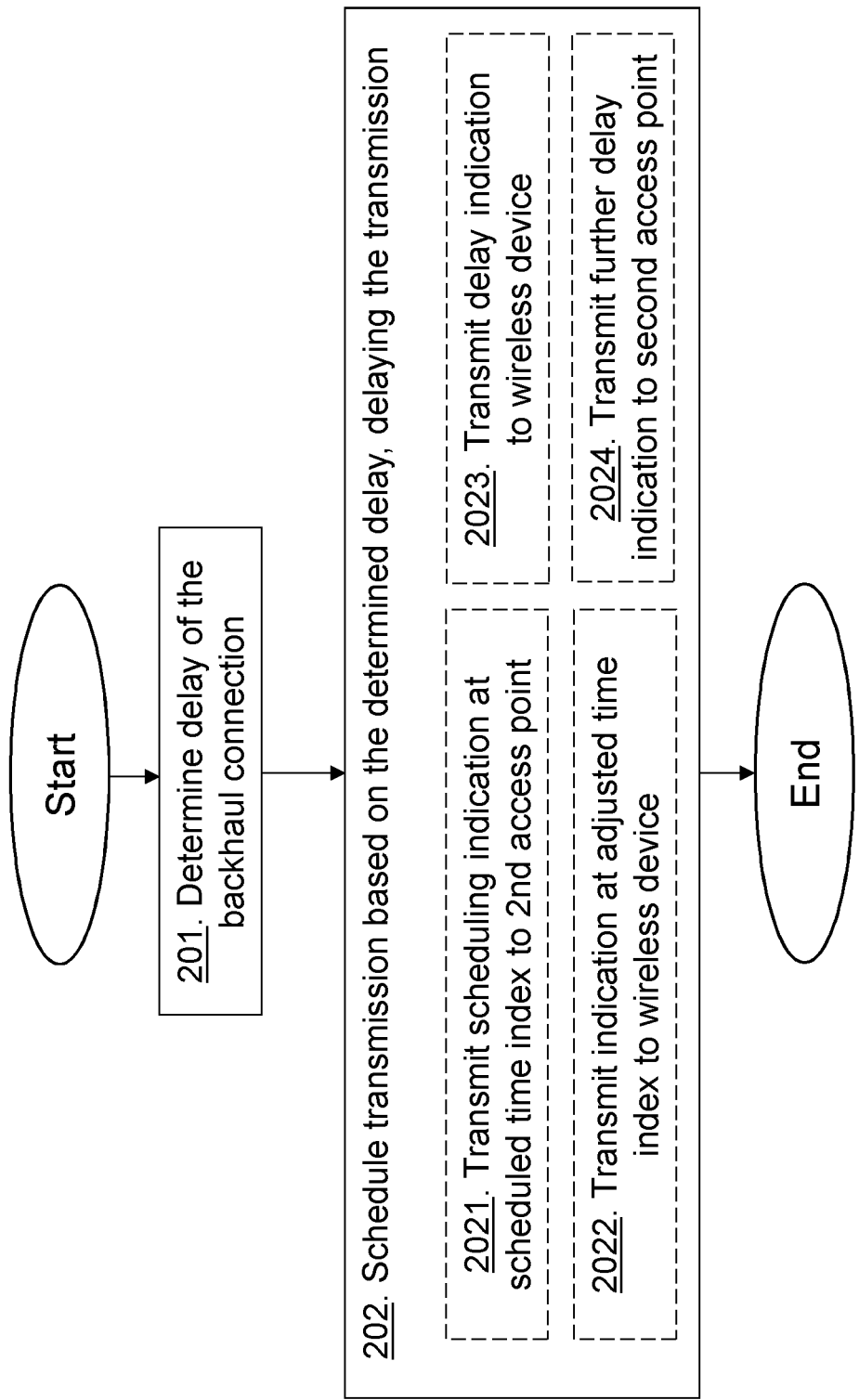
FIG. 2 shows a schematic flowchart depicting a method according to embodiments herein.

The method actions performed by the first access point 12 out of at least two access points for handling communication of the wireless device 10 served by the first access point 12 in the wireless communication network 1 according to some embodiments will now be described with reference to a flowchart depicted in FIG. 2. Actions performed in some embodiments are marked with dashed boxes, and the actions may be performed in any suitable order.

The first access point 12 coordinates communication with the second access point 13 out of the at least two access points in the wireless communication network 1, which coordination is performed over the backhaul connection between the first access point 12 and the second access point 13.

Action 201. The first access point 12 determines the delay of the backhaul connection to the second access point 13. E.g. the first access point may use time tagging of packets over the backhaul connection to determine the delay. Another example would be to use a known pilot sequence of bits and correlate the received signal in order to measure the delay. The delay may then be determined as a power peak of the correlation, assuming time synchronization between said access points. Other ways of determining the delay over the backhaul connection may also be used. It should be noted that the delay over the backhaul connection may cover not only a delay over the backhaul connection, but also a potential processing time of the reception of a signal in the second access point 13. This latter value may be very small and can thus be disregarded in some cases.

Action 202. The first access point 12 schedules a transmission to or from the wireless device 10 based on the determined delay, wherein the transmission from or to the wireless device 10 is delayed. E.g. the first access point 12 may schedule the transmission by adjusting a scheduled time instance by delaying the scheduled time instance to an adjusted time instance based on the determined delay. The time instance may be a time index e.g. a transmission time interval (TTI), a subframe number, a frame number or similar. Furthermore, the first access point may schedule the transmission by further taking a processing time of the wireless device 10 into account.

Action 2021. The first access point 12 may schedule the transmission by transmitting a scheduling indication to the second access point 13 indicating the scheduled transmission, which scheduling indication is transmitted at a scheduled time instance, e.g. TTI or subframe n. The scheduling indication may comprise scheduling information for UL transmissions e.g. Physical Resource Blocks (PRB), a Modulation and Coding Scheme (MCS), a Transmission block Size (TBS) allocated to the wireless device 10. This scheduling information is used for the second access point 12 to perform the reception for the wireless device 10 in the second access point. The scheduling indication may comprise scheduling information for DL transmissions e.g. Physical Resource Blocks (PRB), a Modulation and Coding Scheme (MCS), a Transmission block Size (TBS) allocated to the wireless device 10. Furthermore, a power transmitted for all the PRBs may be comprised in the scheduling indication. Zero power of the transmission indicates that the transmission at the PRB in the first access point 12 is muted. It is also possible to signal the resource utilization of the first access point 12.

Action 2022. The first access point 12 may schedule the transmission by transmitting an indication of the scheduled transmission to the wireless device 10. The indication may be transmitted at the adjusted time instance reduced with the processing time at the wireless device 10. The indication may comprise scheduling information for UL transmissions e.g. Physical Resource Blocks (PRB), a Modulation and Coding Scheme (MCS), a Transmission block Size (TBS) allocated to the wireless device 10. This scheduling information is used for the wireless device 10 to perform an UL transmission. The indication may comprise scheduling information for DL transmissions e.g. Physical Resource Blocks (PRB), a Modulation and Coding Scheme (MCS), a Transmission block Size (TBS) allocated to the wireless device 10. Furthermore, a power transmitted for all the PRBs may be comprised in the scheduling indication. Zero power of the transmission indicates that the transmission at the PRB in the first access point 12 is muted. It is also possible to signal the resource utilization of the first access point 12.

Action 2023. The first access point 12 may schedule the transmission by transmitting a delay indication to the wireless device 10 informing the wireless device 10 of a time instance to transmit or receive with a delay of the determined delay.

Action 2024. The first access point 12 may schedule the transmission by transmitting a further delay indication to the second access point 13 informing the second access point 13 of a further time instance to transmit or receive with a further delay. This may the useful for reducing multi-TTI processing in the first access point 12, or in some embodiments where the delay varies, and in situations with more than one second access point, e.g. in a 5G network where the wireless communication network 1 will be densified a lot as compared to the present situation. In these situations it would be convenient to include the further delay indication in a messaging that instructs the second access point 13 to schedule after waiting e.g. i) an additional number of TTIs after reception of the scheduling indication, or ii) wait an additional number of TTIs after a specific TTI, same number in synchronized network, or iii) to schedule at an indicated future TTI. The upside is then that the first access point 12 may finalize an inter-node signaling once and for all, even if the delays differ between a number of second radio access points. It would also provide a solution in case the delay would be jittering randomly. Then the "wait until TTI number" IE, or wait a specified number of TTIs after reception of scheduling indication, would provide robustness against the randomness.

Figure 3:
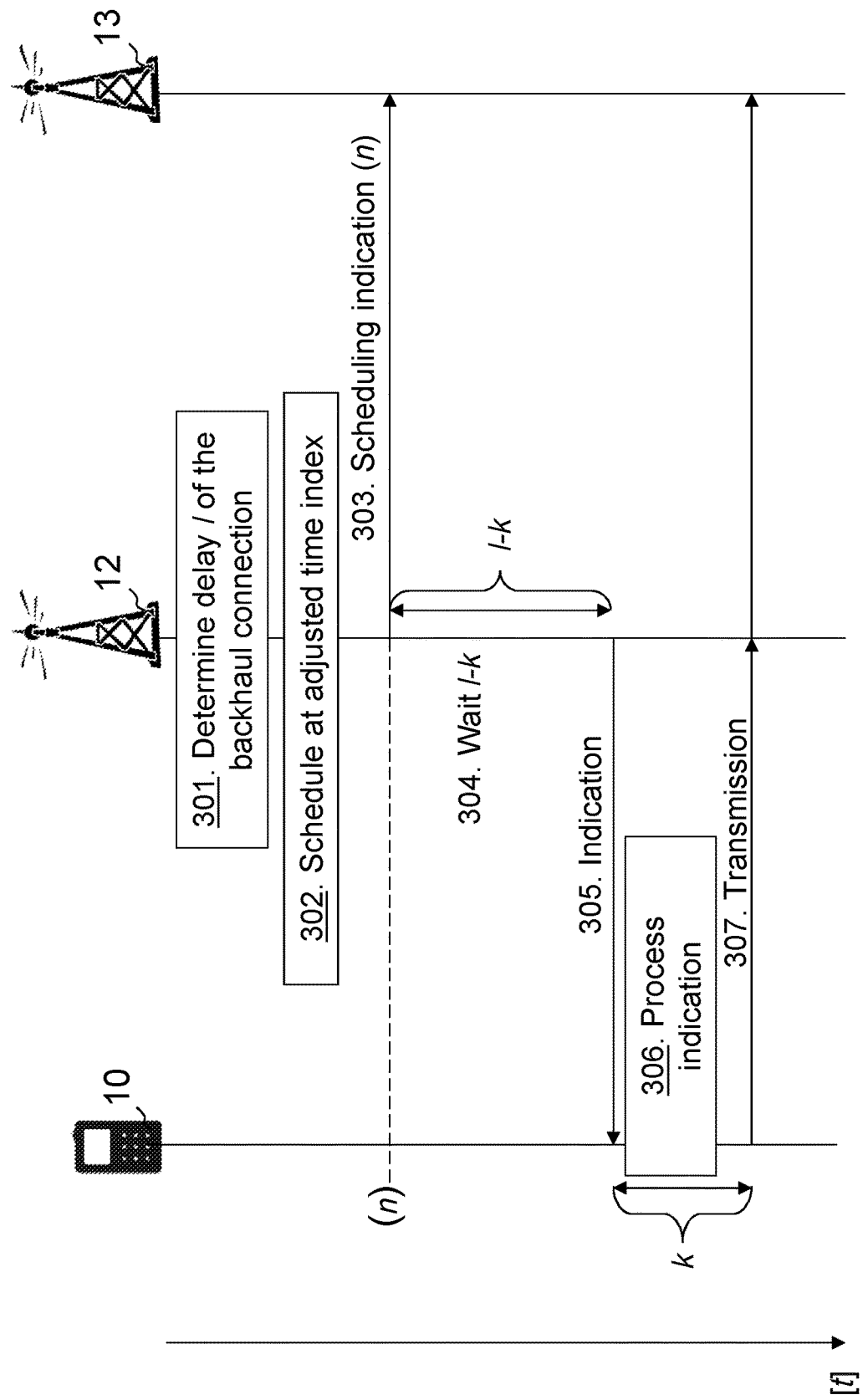
FIG. 3 shows a combined signalling scheme and flowchart according to some embodiments herein.

FIG. 3 is a combined flowchart and signaling scheme according to embodiments herein relating to UL transmissions from the wireless device 10. The time instances are exemplified as TTIs or subframes herein.

Action 301. The first access point 12 determines the delay 'l' of or over the backhaul connection. The delay l may be determined by being measured or estimated over a time.

Action 302. The first access point 12 may then schedule the transmission from the wireless device 10 to an adjusted time instance. E.g. the first access point 12 may schedule the transmission from the wireless device 10 by adjusting and delaying a scheduled time instance, thereby delaying the scheduled time instance to the adjusted time instance based on the determined delay. For example, at TTI or subframe n, instead of scheduling the uplink transmission for TTI or subframe n+k, where k is the processing time of the wireless device 10, the first access point 12 takes the delay l into account and schedules the uplink transmission much longer ahead for the TTI or subframe n+l where l is the delay or latency of the backhaul connection (and l≥k).

Action 303. When the scheduling decision is made at the first access point 12, the first access point 12 forwards the scheduling decision as the scheduling indication at the TTI or subframe n to the second transmission access point 13.

Action 304. The first access node 12 then waits the delay reduced by the processing time of the wireless device, i.e. l–k, before transmitting the indication to the wireless device 10.

Action 305. The indication of the scheduled transmission e.g. grant, is then sent at the TTI or subframe n+l–k to the wireless device 10 by the first access point 12.

Action 306. The wireless device 10 receives and processes the indication over the processing time of k TTIs or subframes.

Action 307. After the wireless device 10 receives the indication, the wireless device 10 will e.g. transmit at the TTI or subframe n+l after kTTI or subframes as specified by 3GPP. In this way, both the first access point 12 and the second access point 13 will be able to receive an uplink transmission at TTI or subframe n+l.

In some embodiments channel prediction is performed ahead in time, to optimize the link adaptation. Since the delay of the backhaul connection may vary, the channel prediction may handle time varying measurement and prediction time instances. An embodiment describing such a time varying adaptive channel predictor is for example a prediction algorithm for channel gain with a corresponding channel estimator and a link adaptation, which prediction algorithm automatically handles multiple and even varying sampling rates. E.g. the channel estimator produces the same parameter values, irrespective of the sampling rate applied, thus the predicted channel gain enables an improved channel estimation.

Figure 4:
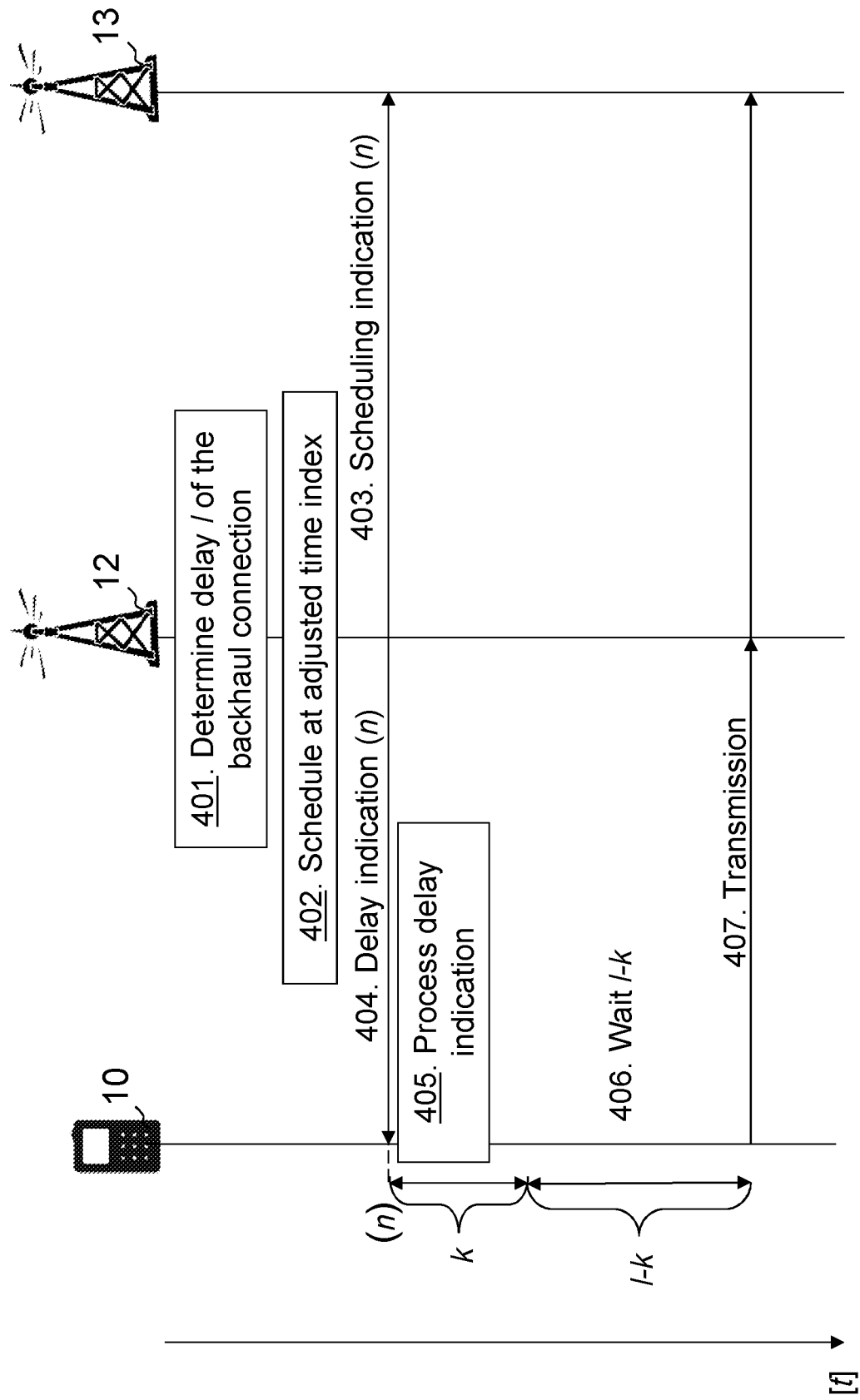
FIG. 4 shows a combined signalling scheme and flowchart according to some embodiments herein.

FIG. 4 is a combined flowchart and signaling scheme according to embodiments herein relating to UL transmissions from the wireless device 10. The time instances are exemplified as TTIs or subframes herein.

Action 401. The first access point 12 determines the delay 'l' of or over the backhaul connection. The delay l may be determined by being measured or estimated over a time.

Action 402. The first access point 12 then schedules the transmission from the wireless device 10 to an adjusted time instance. E.g. the first access point 12 may schedule the transmission from the wireless device 10 by adjusting and delaying a scheduled time instance, thereby delaying the scheduled time instance to the adjusted time instance based on the determined delay. For example, at TTI or subframe n, instead of scheduling the uplink transmission for TTI or subframe n+k, where k is the processing time of the wireless device 10, the first access point 12 takes the delay l into account and schedules the uplink transmission much longer ahead for the TTI or subframe n+l where l is the delay or latency of the backhaul connection (and l≥k).

Action 403. When the scheduling decision is made at the first access point 12, the first access point 12 forwards the scheduling decision as the scheduling indication at the TTI or subframe n to the second transmission access point 13.

Action 404. According to theses embodiments the delay indication of the scheduled transmission e.g. grant, is then sent at the TTI or subframe n to the wireless device 10 by the first access point 12. The delay indication informs the wireless device 10 of the time instance TTI or subframes n+l to transmit with the delay l.

Action 405. The wireless device 10 receives and processes the delay indication over the processing time k.

Action 406. The wireless device 10 then waits the indicated delay reduced with the processing time.

Action 407. The wireless device 10 then transmits the uplink transmission delayed l TTI or subframes. In this way, both the first access point 12 and the second access point 13 will be able to receive the uplink transmission at TTI or subframe n+l.

Figure 5:
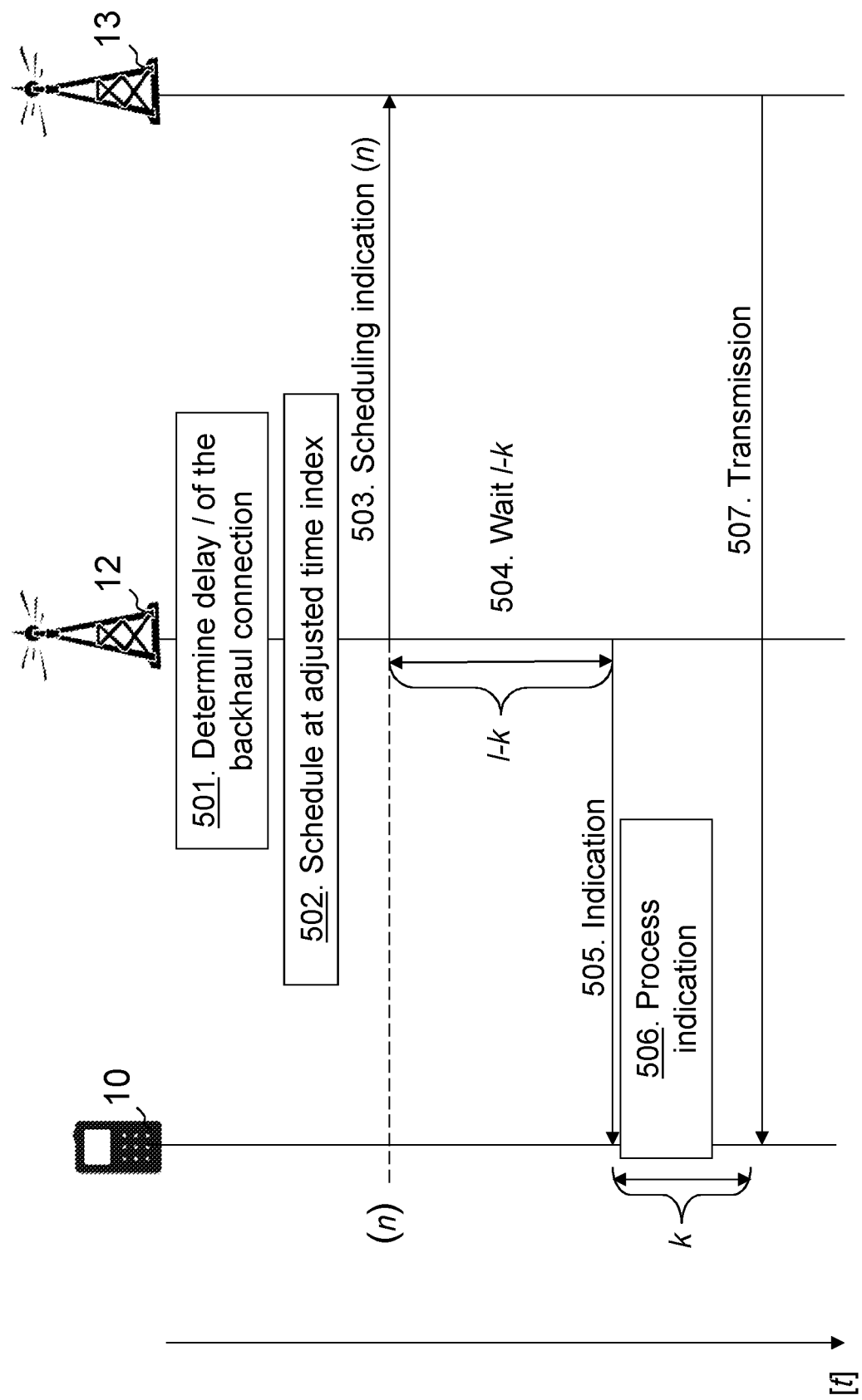
FIG. 5 shows a combined signalling scheme and flowchart according to some embodiments herein.

FIG. 5 is a combined flowchart and signaling scheme according to some embodiments herein relating to DL transmissions to the wireless device 10. The time instances are exemplified as TTIs or subframes herein.

Action 501. The first access point 12 determines the delay 'l' of or over the backhaul connection. The delay l may be determined by being measured or estimated over a time. E.g. the first access point 12 may transmit to the second access point 13 time tagging information for delay measurement, and the second access point 13 may signal the measured delay back to the first access point 12. Alternatively, in a symmetric situation the second access point 13 could just time tag a packet and the first access point may deduce the latency from said packet. The second access point 13 may comprise a reporting scheme that only report latency or delay back to the first access point 12 at a change of measured delay.

Action 502. The first access point 12 then schedules the DL transmission to the wireless device 10 to an adjusted time instance. E.g. the first access point 12 may schedule the transmission to the wireless device 10 by adjusting and delaying a scheduled time instance, thereby delaying the scheduled time instance to the adjusted time instance based on the determined delay. For example, at TTI or subframe n, instead of scheduling the DL transmission for TTI or subframe n+k, the first access point 12 takes the delay l into account and schedules the downlink transmission delayed to the TTI or subframe n+l where l is the delay or latency of the backhaul connection (and l≥k).

Action 503. When the scheduling decision is made at the first access point 12, the first access point 12 forwards the scheduling decision as the scheduling indication at the TTI or subframe n to the second transmission access point 13 indicating the DL transmission.

Action 504. The first access node 12 waits the delay reduced by the processing time of the wireless device, i.e. l–k, before transmitting the indication e.g. Downlink assignment, to the wireless device 10.

Action 505. The indication of the scheduled transmission e.g. DL assignment, is then sent at the TTI or subframe n+/–k to the wireless device 10 by the first access point 12.

Action 506. The wireless device 10 receives and processes the indication over the processing time of k TTIs or subframes.

Action 507. After the wireless device 10 processes the indication, the wireless device 10 will receive the DL transmission from the second access point 13 at the TTI or subframe n+l.

Figure 6:
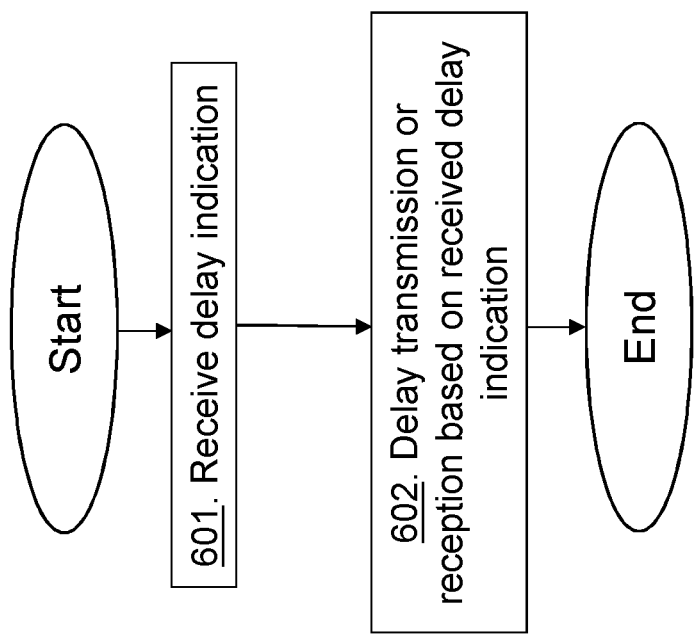
FIG. 6 shows a schematic flowchart depicting a method according to embodiments herein.

The method actions performed by the wireless device 10 for handling communication of the wireless device 10 served by the first access point 12 out of at least two access points in a wireless communication network 1 according to some embodiments will now be described with reference to a flowchart depicted in FIG. 6. Actions performed in some embodiments are marked with dashed boxes.

The first access point 12 coordinates communication with the second access point 12 out of the at least two access points in the wireless communication network 1. The coordination is performed over the backhaul connection between the first access point 12 and the second access point 13.

Action 601. The wireless device 10 receives the delay indication from the first access point 12 informing the wireless device 10 of the time instance to transmit or receive with a delay associated with the delay of the backhaul connection. E.g. the delay indication may indicate the delay of the backhaul connection reduced with the processing time at the wireless device 10.

Action 602. The wireless device 10 then delays the transmission or reception of data based on the received delay indication. Thus, coordinated transmissions will be successful even with a delay of the backhaul connection.

The wireless device 10 may further receive further information e.g. transmission/reception mode used, routing information for the data etc.

Figure 7:
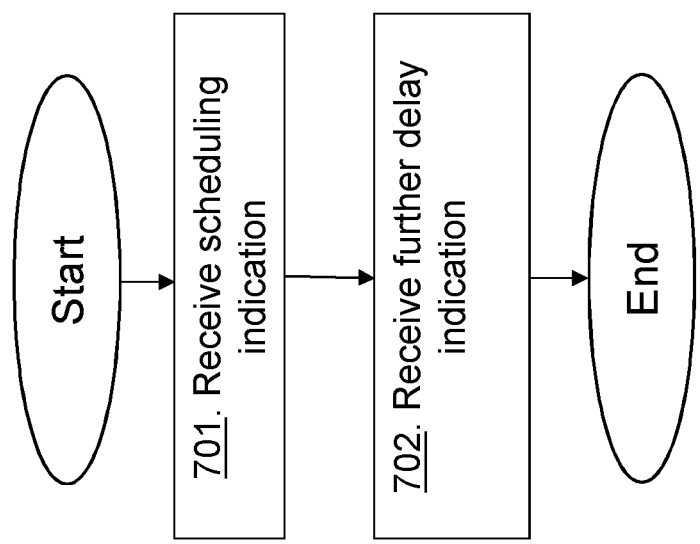
FIG. 7 shows a schematic flowchart depicting a method according to embodiments herein.

The method actions performed by the second access point 13 out of at least two access points for handling communication of the wireless device 10 served by the first access point 12 in the wireless communication network 1 according to some embodiments will now be described with reference to a flowchart depicted in FIG. 7. The first access point 12 coordinates communication with the second access point 13 out of the at least two access points in the wireless communication network 1, and which coordination is performed over the backhaul connection between the first access point 12 and the second access point 13.

Action 701. The second access point 13 receives the scheduling indication from the first access point 12 indicating the scheduled transmission. Depending on different coordination schemes, the second access point 13 will perform an action at the time instance and resource indicated at the scheduling indication. For example in UL CoMP, after receiving the scheduling indication, the second access point 13 is going to perform reception at the indicated time instance.

Action 702. The second access point 13 further receives the further delay indication from the first access point 12 informing the second access point 13 of the further time instance to transmit or receive with the further delay. As stated above the first access point 12 may in some embodiments schedule the transmission by transmitting the further delay indication to the second access point 13 informing the second access point 13 of the further time instance to transmit or receive with a further delay. This may be the useful for reducing multi-TTI processing in the first access point 12, or in some embodiments where the delay varies, and in situations with more than one second access point, e.g. in a 5G network where the communication network will be densified a lot as compared to the present situation. In these situations it would be convenient to include the further delay indication in a messaging that instructs the second access point 13 to schedule after waiting e.g. i) an additional number of TTIs after reception of the scheduling indication, or ii) wait an additional number of TTIs after a specific TTI, same number in synchronized network, or iii) to schedule at an indicated future TTI. The upside is then that the first access point 12 may finalize an inter-node signaling once and for all, even if the delays differ between a number of second radio access points. It would also provide a solution in case the delay would be jittering randomly. Then the "wait until TTI number" IE, or wait a specified number of TTIs after reception of scheduling indication, would provide robustness against the randomness.

The second access point 13 may then transmit or receive with the further delay according to the the further delay indication. The second access point 13 may in some embodiments signal the measured delay back to the first access point 12. Alternatively, in a symmetric situation the second access point 13 may just time tag a packet and the first access point 12 may deduce the delay from said packet. The second access point 13 may comprise a reporting scheme that only report latency or delay back to the first access point 12 at a change of measured delay.

Figure 8:
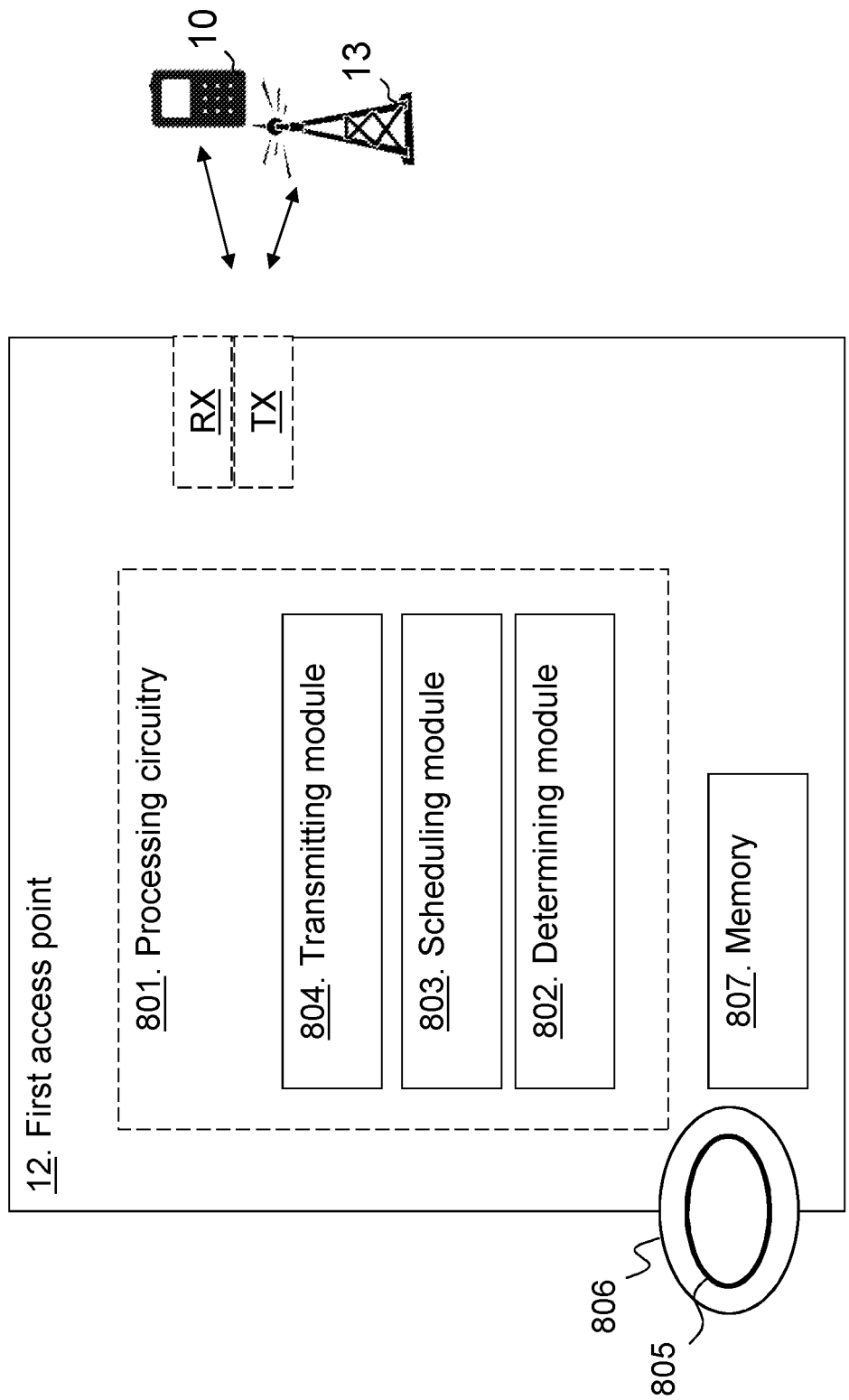
FIG. 8 shows a block diagram depicting a first access point according to embodiments herein.

In order to perform the methods herein the first access point 12 is provided. FIG. 8 shows the first access point 12 for handling communication of the wireless device 10 served by the first access point in the wireless communication network 1. The first access point out of at least two access points is configured to coordinate communication with the second access point 13 out of the at least two access points in the wireless communication network 1. The first access point 12 is configured to coordinate the communication over the backhaul connection between the first access point 12 and the second access point 13. The first access node 12 may comprise processing circuitry 801 configured to perform the methods herein.

The first access point 12 is configured to determine the delay of the backhaul connection to the second access point 13. The first access node 12 may comprise a determining module 802. The processing circuitry 801 and/or the determining module 802 may be configured to determine the delay of the backhaul connection to the second access point 13.

The first access node 12 is further configured to schedule a transmission to or from the wireless device 10 based on the determined delay, wherein the transmission from or to the wireless device 10 is delayed. The first access node 12 may comprise a scheduling module 803, such as a scheduler. The processing circuitry 801 and/or the scheduling module 803 may be configured to schedule a transmission to or from the wireless device 10 based on the determined delay, wherein the transmission from or to the wireless device 10 is delayed. The first access point 12, the processing circuitry 801 and/or the scheduling module 803 may be configured to schedule the transmission by adjusting a scheduled time instance by delaying the scheduled time instance to an adjusted time instance based on the determined delay.

The first access point 12, the processing circuitry 801 and/or the scheduling module 803 may be configured to schedule the transmission by taking a processing time of the wireless device 10 into account.

The first access point 12, the processing circuitry 801 and/or the scheduling module 803 may be configured to schedule the transmission by transmitting the scheduling indication to the second access point 13 indicating the scheduled transmission.

The first access point 12 may be configured to transmit the scheduling indication at the scheduled time instance. The first access node 12 may comprise a transmitting module 804. The processing circuitry 801 and/or the transmitting module 804 may be configured to transmit the scheduling indication at the scheduled time instance.

The first access point 12, the processing circuitry 801 and/or the scheduling module 803 may be configured to schedule the transmission by transmitting the indication to the wireless device 10, of the scheduled transmission, at the adjusted time instance reduced with the processing time at the wireless device 10.

The first access point 12, the processing circuitry 801 and/or the scheduling module 803 may be configured to schedule the transmission by transmitting the delay indication to the wireless device 10 informing the wireless device 10 of a time instance to transmit or receive with a delay of the determined delay.

The first access point 12, the processing circuitry 801 and/or the scheduling module 803 may be configured to schedule the transmission by transmitting the further delay indication to the second access point 13 informing the second access point 13 of a time instance to transmit or receive with a further delay.

The methods according to the embodiments described herein for the first access point 12 are respectively implemented by means of e.g. a computer program 805 or a computer program product, comprising instructions, i.e., software code portions, which, when executed on at least one processor, cause the at least one processor to carry out the actions described herein, as performed by the first access point 12. The computer program 805 may be stored on a computer-readable storage medium 806, e.g. a disc or similar. The computer-readable storage medium 806, having the computer program stored thereon, may comprise the instructions which, when executed on at least one processor, cause the at least one processor to carry out the actions described herein, as performed by the first access point 12. In some embodiments, the computer-readable storage medium may be a non-transitory computer-readable storage medium.

The first access point 12 further comprises a memory 807. The memory comprises one or more units to be used to store data on, such as delay, wireless device data, resources, scheduling information, time instances, application/s to perform the methods disclosed herein when being executed, and similar. The first access node 12 may comprise a transmitting (Tx) and receiving (Rx) unit such as a transmitter, a receiver, a transceiver or similar.

Figure 9:
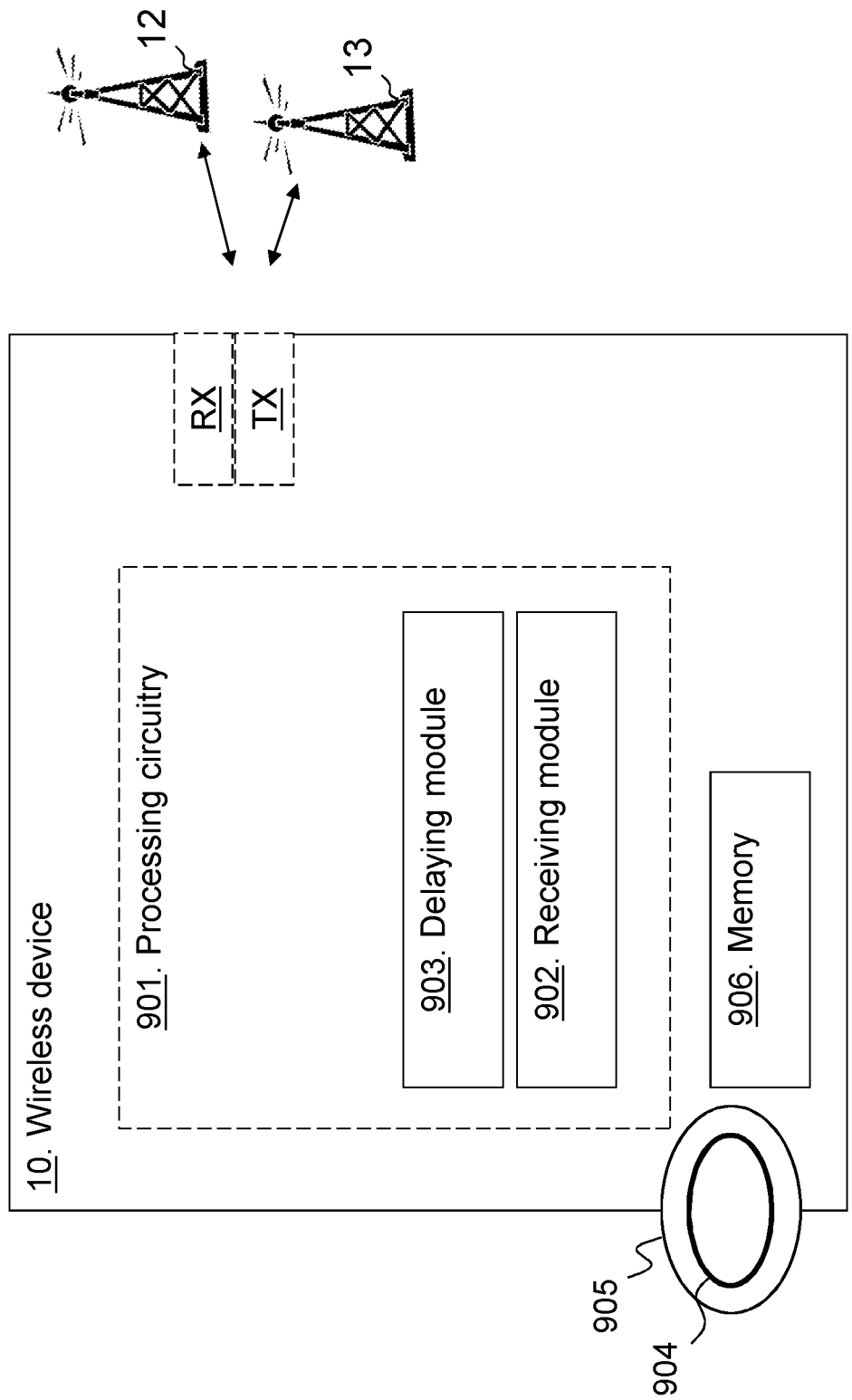
FIG. 9 shows a block diagram depicting a wireless device according to embodiments herein.

In order to perform the methods herein the wireless device 10 is provided. FIG. 9 is a block diagram depicting the wireless device 10 for handling communication of the wireless device 10 served by the first access point 12 out of at least two access points in a wireless communication network 1. The first access point 12 coordinates communication with the second access point 13 out of the at least two access points in the wireless communication network 1. The coordination is performed over the backhaul connection between the first access point 12 and the second access point 13. The wireless device 10 may comprise processing circuitry 901 configured to perform the methods herein.

The wireless device 10 is configured to receive the delay indication from the first access point 12 informing the wireless device 10 of the time instance to transmit or receive with the delay associated with the delay of the backhaul connection. The wireless device 10 may comprise a receiving module 902. The processing circuitry 901 and/or the receiving module 902 may be configured to receive the delay indication from the first access point 12 informing the wireless device 10 of the time instance to transmit or receive with the delay associated with the delay of the backhaul connection.

The wireless device 10 is configured to delay the transmission or the reception of data based on the received delay indication. The wireless device 10 may comprise a delaying module 903. The processing circuitry 901 and/or the delaying module 903 may be configured to delay the transmission or the reception of data based on the received delay indication.

The methods according to the embodiments described herein for the wireless device 10 are respectively implemented by means of e.g. a computer program 904 or a computer program product, comprising instructions, i.e., software code portions, which, when executed on at least one processor, cause the at least one processor to carry out the actions described herein, as performed by the wireless device 10. The computer program 904 may be stored on a computer-readable storage medium 905, e.g. a disc or similar. The computer-readable storage medium 905, having the computer program stored thereon, may comprise the instructions which, when executed on at least one processor, cause the at least one processor to carry out the actions described herein, as performed by the wireless device 10. In some embodiments, the computer-readable storage medium may be a non-transitory computer-readable storage medium.

The wireless device 10 further comprises a memory 906. The memory comprises one or more units to be used to store data on, such as delay, access point data, resources, scheduling information, time instances, application/s to perform the methods disclosed herein when being executed, and similar. The wireless device 10 may comprise a transmitting (Tx) and receiving (Rx) unit such as a transmitter, a receiver, a transceiver or similar.

Figure 10:
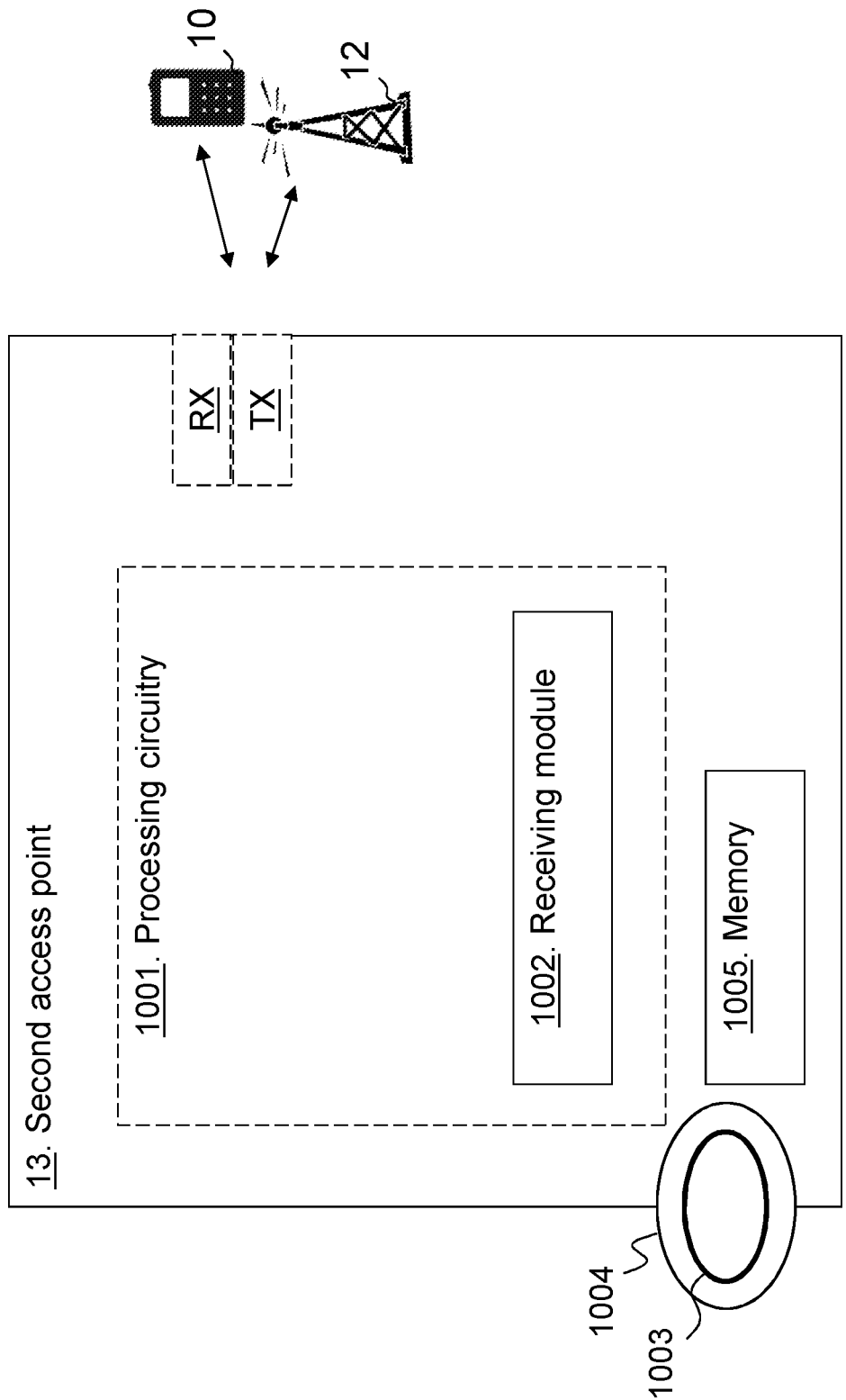
FIG. 10 shows a block diagram depicting a second access point according to embodiments herein.

In order to perform the methods herein the second access point 13 is provided. FIG. 10 is a block diagram depicting the second access point 12 for handling communication of the wireless device 10 served by the first access point 12 in the wireless communication network 1. The first access point 12 out of at least two access points is configured to coordinate communication with the second access point 13 out of the at least two access points in the wireless communication network 1. The second access point 13 is configured to coordinate with the first access point 12 over the backhaul connection between the second access point 13 and the first access point 12. The second access point 13 may comprise processing circuitry 1001 configured to perform the methods herein.

The second access point 13 is configured to receive the scheduling indication from the first access point 12 indicating a scheduled transmission. The second access point 12 may comprise a receiving module 1002. The processing circuitry 1002 and/or the receiving module 1002 may be configured to receive the scheduling indication from the first access point 12 indicating a scheduled transmission.

The second access point 13, the processing circuitry 1002 and/or the receiving module 1002 may be configured to receive the further delay indication from the first access point 12 informing the second access point 13 of the further time instance to transmit or receive with the further delay. The second access point 13, the processing circuitry 1002 may then be configured to transmit or receive with the further delay according to the the further delay indication.

The methods according to the embodiments described herein for the second access point 13 are respectively implemented by means of e.g. a computer program 1003 or a computer program product, comprising instructions, i.e., software code portions, which, when executed on at least one processor, cause the at least one processor to carry out the actions described herein, as performed by the second access point 13. The computer program 1003 may be stored on a computer-readable storage medium 1004, e.g. a disc or similar. The computer-readable storage medium 1004, having the computer program stored thereon, may comprise the instructions which, when executed on at least one processor, cause the at least one processor to carry out the actions described herein, as performed by the second access point 13. In some embodiments, the computer-readable storage medium may be a non-transitory computer-readable storage medium.

The second access point 13 further comprises a memory 1005. The memory comprises one or more units to be used to store data on, such as delay, access point data, resources, scheduling information, time instances, application/s to perform the methods disclosed herein when being executed, and similar. The second access point 12 may comprise a transmitting (Tx) and receiving (Rx) unit such as a transmitter, a receiver, a transceiver or similar.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of an access point or wireless device, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance trade-offs inherent in these design choices.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

The invention claimed is:

1. A method performed by a first access point, of at least two access points in a wireless communication network, for handling communication of a wireless device served by the first access point, the first access point coordinating communication with a second access point, of the at least two access points, over a backhaul connection between the first access point and the second access point, the method comprising:
   determining a delay of the backhaul connection to the second access point; and
   scheduling a transmission to or from the wireless device based on the determined delay, wherein the transmission from or to the wireless device is delayed from a scheduled time instance to an adjusted time instance based on the determined delay, and wherein the scheduling comprises:
      transmitting, at the scheduled time instance, a scheduling indication to the second access point indicating the scheduled transmission, and
      transmitting, at the adjusted time instance reduced by a processing time of the wireless device, an indication of the scheduled transmission to the wireless device.

2. The method according to claim 1, wherein the scheduling further comprises:
   transmitting, to the wireless device, a delay indication informing the wireless device of a time instance to transmit or receive with a delay of the determined delay.

3. The method according to claim 1, wherein the scheduling further comprises:
   transmitting, to the second access point, a further delay indication informing the second access point of a time instance to transmit or receive with a further delay.

4. A method performed by a wireless device for handling communication with a first access point of at least two access points in a wireless communication network, the first access point serving the wireless device and coordinating communication with a second access point, of the at least two access points, over a backhaul connection between the first access point and the second access point, the method comprising:
   receiving an indication of scheduled transmission from the first access point, wherein the indication of the scheduled transmission informs the wireless device of an adjusted time instance to transmit or receive with a delay associated with a delay of the backhaul connection between the first access point and the second access point, and wherein the indication of the scheduled transmission is received, from the first access point, at the adjusted time instance reduced by a processing time of the wireless device; and
   processing the received indication of the scheduled transmission over the processing time of the wireless device, wherein processing the received indication of the scheduled transmission enables the second access point to receive or transmit the scheduled transmission with an intended resource allocation.

5. A method, in a wireless communication network, for handling communication of a wireless device served by a first access point, of at least two access points in the wireless communication network, the first access point coordinating communication with a second access point, of the at least two access points, over a backhaul connection between the first access point and the second access point, the method comprising:
   determining, by the first access point, a delay of the backhaul connection to the second access point; and
   scheduling, by the first access point, a transmission to or from the wireless device based on the determined delay, wherein the transmission from or to the wireless device is delayed from a scheduled time instance to an adjusted time instance based on the determined delay, and wherein the scheduling comprises:
      transmitting, at the scheduled time instance, a scheduling indication to the second access point indicating the scheduled transmission;
      transmitting, at the adjusted time instance reduced by a processing time of the wireless device, an indication of the scheduled transmission to the wireless device;
      receiving, by the second access point, the scheduling indication from the first access point indicating the scheduled transmission; and
      receiving, by the second access point, a further delay indication from the first access point informing the second access point of a further time instance to transmit or receive with a further delay.

6. A first access point, of at least two access points in a wireless communication network, for handling communication of a wireless device served by the first access point, the first access point configured to coordinate communication with a second access point, of the at least two access points, over a backhaul connection between the first access point and the second access point, the first access point comprising:

at least one processor; and at least one memory storing computer-executable instructions that, when executed by the at least one processor, configure the first access point to:

determine a delay of the backhaul connection to the second access point; and schedule a transmission to or from the wireless device based on the determined delay, wherein the transmission from or to the wireless device is delayed from a scheduled time instance to an adjusted time instance based on the determined delay, and wherein the execution of the computer-executable instructions configures the first access point to schedule the transmission by:

transmitting, at the scheduled time instance, a scheduling indication to the second access point indicating the scheduled transmission, and transmitting, at the adjusted time instance reduced by a processing time of the wireless device, an indication of the scheduled transmission to the wireless device.

7. The first access point according to claim 6, wherein the execution of the computer-executable instructions configures the first access point to schedule the transmission further based on the processing time of the wireless device.

8. The first access point according to claim 6, wherein the execution of the computer-executable instructions configures the first access point to schedule the transmission by transmitting, to the wireless device, a delay indication informing the wireless device of a time instance to transmit or receive with a delay of the determined delay.

9. The first access point according to claim 6, wherein the execution of the computer-executable instructions configures the first access point to schedule the transmission by transmitting, to the second access point, a further delay indication informing the second access point of a time instance to transmit or receive with a further delay.

10. A wireless device configured to handle communication with a first access point of at least two access points in a wireless communication network, the first access point serving the wireless device and coordinating communication with a second access point, of the at least two access points, over a backhaul connection between the first access point and the second access point, the wireless device comprising:

at least one processor; and at least one memory storing computer-executable instructions that, when executed by the at least one processor, configure the wireless device to:

receive an indication of scheduled transmission from the first access point, wherein the indication of the scheduled transmission informs the wireless device of an adjusted time instance to transmit or receive with a delay associated with a delay of the backhaul connection between the first access point and the second access point, and wherein the indication of the scheduled transmission is received, from the first access point, at the adjusted time instance reduced by a processing time of the wireless device; and process the received indication of the scheduled transmission over the processing time of the wireless device, wherein processing the received indication of the scheduled transmission enables the second access point to receive or transmit the scheduled transmission with an intended resource allocation.

11. A wireless communication network for handling communication of a wireless device served by a first access point of at least two access points, the first access point coordinating communication with a second access point, of the at least two access points, over a backhaul connection between the first access point and the second access point, the wireless communication network comprising:

the first access point, wherein the first access point comprises:

at least one first processor; and at least one first memory storing computer-executable instructions that, when executed by the at least one first processor, configure the first access point to:

determine a delay of the backhaul connection to the second access point; and schedule a transmission to or from the wireless device based on the determined delay, wherein the transmission from or to the wireless device is delayed from a scheduled time instance to an adjusted time instance based on the determined delay, and wherein the execution of the computer-executable instructions configures the first access point to schedule the transmission by:

transmitting, at the scheduled time instance, a scheduling indication to the second access point indicating the scheduled transmission; and transmitting, at the adjusted time instance reduced by a processing time of the wireless device, an indication of the scheduled transmission to the wireless device, and the second access point, wherein the second access point comprises:

at least one second processor; and at least one second memory storing computer-executable instructions that, when executed by the at least one second processor, configure the second access point to:

receive the scheduling indication from the first access point indicating the scheduled transmission; and receive a further delay indication from the first access point informing the second access point of a further time instance to transmit or receive with a further delay.

12. A non-transitory computer-readable storage medium having computer-executable instructions that, when executed by at least one processor, configure the first access point to perform operations corresponding to the method of claim 1.

* * * * *